(12) United States Patent
Huyghe

(10) Patent No.: US 9,358,760 B2
(45) Date of Patent: Jun. 7, 2016

(54) PRESTRETCHED AGRICULTURAL STRETCH WRAP FILM

(75) Inventor: Michael Huyghe, Hardenberg (NL)

(73) Assignee: COMBIPAC BV, Hardenberg (NL)

( * ) Notice: Subject to any disclaimer, the term of this patent is extended or adjusted under 35 U.S.C. 154(b) by 1399 days.

(21) Appl. No.: 12/680,185

(22) PCT Filed: Sep. 26, 2008

(86) PCT No.: PCT/EP2008/008213
§ 371 (c)(1),
(2), (4) Date: Apr. 19, 2010

(87) PCT Pub. No.: WO2009/040129
PCT Pub. Date: Apr. 2, 2009

(65) Prior Publication Data
US 2010/0205910 A1    Aug. 19, 2010

(30) Foreign Application Priority Data
Sep. 28, 2007 (BE) .................... 2007/0466

(51) Int. Cl.
*B32B 27/32* (2006.01)
*B32B 27/30* (2006.01)
(Continued)

(52) U.S. Cl.
CPC ............. *B32B 27/308* (2013.01); *A01F 15/071* (2013.01); *B29C 55/023* (2013.01); *B32B 27/08* (2013.01); *B32B 27/20* (2013.01); *B32B 27/306* (2013.01); *B32B 27/32* (2013.01); *A01F 2015/0745* (2013.01); *B29K 2023/0625* (2013.01); *B29K 2023/0633* (2013.01);
(Continued)

(58) Field of Classification Search
USPC ................ 53/398.2, 587, 588, 589, 399, 441, 53/389.2; 428/500, 516, 399
See application file for complete search history.

(56) References Cited

U.S. PATENT DOCUMENTS 4,302,920 A     12/1981 Lancaster et al.
4,664,866 A *   5/1987 van der Heijden ............ 264/519
(Continued)

FOREIGN PATENT DOCUMENTS

AU          760 060         3/2000
CA          2474143 A1      4/2004
(Continued)

OTHER PUBLICATIONS

International Search Report dated Mar. 12, 2009 and issued to international application PCT/EP2008/008213.
(Continued)

*Primary Examiner* — Nathaniel Chukwurah
(74) *Attorney, Agent, or Firm* — Knobbe, Martens, Olson & Bear, LLP

(57) ABSTRACT

The present invention relates to a prestretched agricultural stretch wrap film which is used for baling applications when packaging for example grass, maize, sugar beet pulp, malt, straw, household refuse and the like. The prestretched agricultural stretch wrap film according to the present invention is produced by prestretching a polyethylene-containing co-extruded blown film, which comprises at least two layers joined to one another, in the longitudinal direction by at most 70%, so that it still retains an elongation capability in the longitudinal direction of at least 310% or so that a force is to be exerted on said film of less than 6 N in order to stretch the film by 75% in the longitudinal direction.

16 Claims, 7 Drawing Sheets

(51) Int. Cl.
| | |
|---|---|
| A01F 15/07 | (2006.01) |
| B29C 55/02 | (2006.01) |
| B32B 27/08 | (2006.01) |
| B32B 27/20 | (2006.01) |
| B29K 23/00 | (2006.01) |

(52) U.S. Cl.
CPC ..... *B29K2023/083* (2013.01); *B32B 2250/246* (2013.01); *B32B 2270/00* (2013.01); *B32B 2307/51* (2013.01); *B32B 2307/518* (2013.01); *B32B 2307/5825* (2013.01); *B32B 2307/71* (2013.01); *B32B 2307/7244* (2013.01); *B32B 2307/732* (2013.01); *B32B 2553/00* (2013.01)

(56) References Cited

U.S. PATENT DOCUMENTS

| | | | |
|---|---|---|---|
| 4,833,017 A | 5/1989 | Benoit | |
| 5,273,809 A | 12/1993 | Simmons | |
| 6,352,748 B1* | 3/2002 | Aylward et al. | 428/14 |
| 6,857,251 B2* | 2/2005 | McClure et al. | 53/587 |
| 2001/0014401 A1* | 8/2001 | Bonke et al. | 428/516 |
| 2002/0174628 A1* | 11/2002 | Lancaster et al. | 53/441 |
| 2006/0243842 A1 | 11/2006 | Saldana Garcia | |
| 2009/0311472 A1* | 12/2009 | McGee et al. | 428/131 |

FOREIGN PATENT DOCUMENTS

| | | |
|---|---|---|
| EP | 0531021 A1 | 3/1993 |
| EP | 0 614 810 | 9/1994 |
| EP | 0781651 A1 | 7/1997 |
| GB | 2395165 A | 5/2004 |
| WO | WO 98/50219 A1 | 11/1998 |
| WO | WO 99/67080 | 12/1999 |
| WO | WO 2005/103123 A1 | 11/2005 |
| WO | WO 2007/068766 A1 | 6/2007 |

OTHER PUBLICATIONS

ITW Crop Packaging Systems, Grasslands Edition, newsletter and map, in 2 pages.
Mole Valley Farmers, Silawrap Newletter 2002, in 1 page.
Silawrap® Enduro leaflet, in 8 pages (2002).
Notice of Opposition to a European Patent for European Patent Application No. EP08834021.1, filed on Feb. 21, 2014, in 64 pages.
Annex 1: Marketing material distributed 2008, in 6 pages.
Marketing material for Trioplast pre-stretched Balewrap (leaflet), in 2 pages.
TRIOPLUS® advertisement, *Växtodlaren*, p. 52 (May 2007).
"Växtodlaren" (entire publication) (May 2007), in 68 pages.
TRIONYTT corporate newsletter, week 53 issue, incl. article on p. 3 relating to prestretched balewrap (2005), in 4 pages.
Topwrap X-treme marketing material (leaflet), in 2 pages.
Topwrap® 2000 and Topwrap X-treme marketing material/user instructions (leaflet), in 2 pages.
Customer/order information extracted from Trioplast's enterprise resource planning system, in 1 page.
Production Order No. 138350, including specification of requirements, in 3 pages.
Production Order No. 138576, in 2 pages.
Dowlex™ 2045S product sheet, in 3 pages.
Dowlex 2045 product sheet, in 2 pages.
Invoice No. 1709189 (Felleskjöpet Agri BA), in 1 page.
Invoice No. 1710058 (Resteco S.A.), in 2 pages.
Account statement showing payment of Invoice No. 1709189, in 4 pages.
Account statement showing payment of Invoice No. 1710058, in 2 pages.
Bill of Lading No. VMO004181, in 2 pages.
Movement Certificate for EUR. 1 No. A 1713498, in 2 pages.
Customs Invoice No. 0494, in 1 page.
Certificate from Chilean Customs, in 1 page.
Invoice No. 1709595 (Konefarmi OY), in 1 page.
Bank transaction details showing payment from Konefarmi OY, in 1 page.
Invoice No. 1710117 (Markku Hoisio), in 1 page.
Bank transaction details showing payment from Markku Hosio, in 1 page.
Production Order No. 139258, in 2 pages.
Invoice No. 1710933, in 1 page.
Invoice No. 1710934, in 1 page.
Invoice No. 1710936, in 1 page.
Advice of incoming payments, in 1 page.
E-mail from Volac reporting field trials, in 1 page.
Internal report of field trials in Scotland, Sep. 14-15, 2005, in 4 pages.
Presentation reporting field trials in Hyltebruk, Sweden, Sep. 2005, in 26 pages.
Report of development test at SLU, in 4 pages.
OHIM database extract showing CTM registration, in 1 page.
Trioplus product information/marketing letter from Lantmännen, in 1 page.
Memo regarding manufacturing defects, in 1 page.
Letter from Trioplast and Lantmännen to customers who bought Trioplus, in 1 page.
Presentation of Top Wrap X-treme at Volac Meeting, Oct. 10, 2006, in 10 pages.
Topwrap X-treme user instructions, in 2 pages.
E-mail from Volac, in 4 pages.
Testimony by Harald Akesson, Lantmännen, Feb. 7, 2014, in 1 page.
Customer/order information extracted from Trioplast's enterprise resource planning system, in 10 pages.
Testimony by Marcus Sjöberg, Dec. 22, 2013, and Annex 1, in 13 pages.
Testimony by Brian Peacock, Jan. 21, 2014, and Annex 1, in 13 pages.
Meeting agenda for Volac, Oct. 10, 2006, Sweden, in 3 pages.
E-mail, in 1 page.
Delivery Note for Order No. 1165272 (Konefarmi OY), in 1 page.
Delivery Note for Order No. 1166512 (Markku Hosio), in 1 page.
Delivery Note for Order No. 1167359 (Hakan Gustavsson), in 1 page.
Delivery Note for Order No. 1167360 (Martin Andersson), in 1 page.
Delivery Note for Order No. 1167362 (Zakkez), in 1 page.
European Patent Office communication enclosing Apr. 29, 2015 Letter of Opposition filed by Trioplast AB against European Patent Application No. 08834021.1, dated May 8, 2015, in 17 pages.
Dowlex 2645 product sheet, in 3 pages.
Translation of Invoice No. 1710058 (Resteco S.A.), in 2 pages.
Specification of requirements for article No. P10145; previously presented as part of Production Order No. 138350, including specification of requirements, with English translation, published on Jun. 25, 2007, in 2 pages.
Specification of requirements for Trial order No. P10167, published on Feb. 7, 2007, in 2 pages.
Test report No. 070705-1 testing physical properties, including MD elongation, of article No. P10145, published on Jul. 5, 2007, in 2 pages.

* cited by examiner

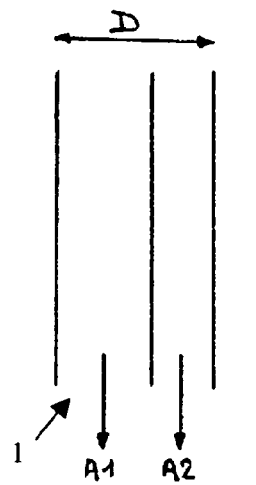
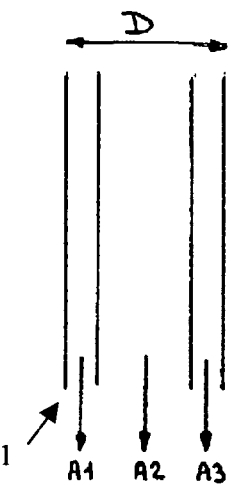
Fig. 1a  Fig. 1b  Fig. 1c
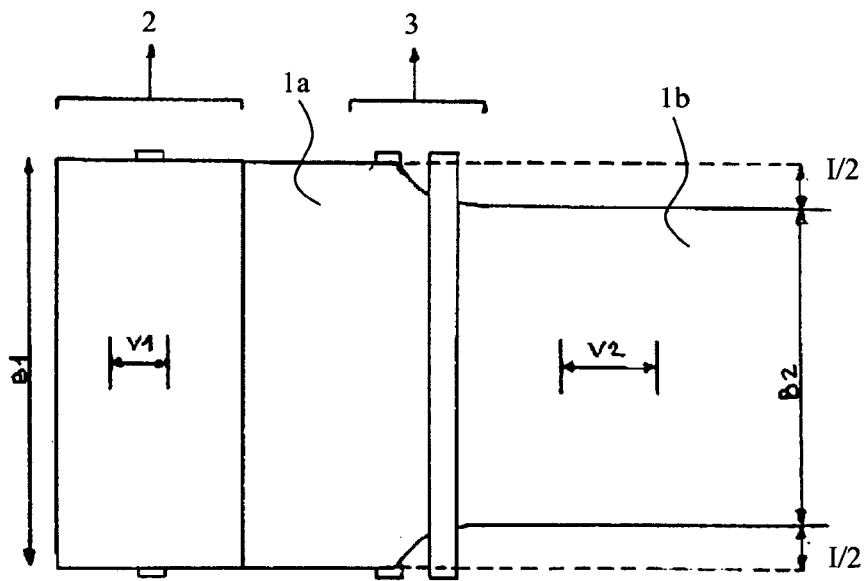
Fig. 2

PRESTRETCHED AGRICULTURAL STRETCH WRAP FILM

CROSS-REFERENCE TO RELATED APPLICATIONS

This application is the U.S. National Phase under 35 U.S.C. §371 of International Application PCT/EP2008/008213, filed Sep. 26, 2008, which claims priority to BE 2007/0466, filed Sep. 28, 2007.

The present invention relates to a prestretched agricultural stretch wrap film suitable for baling applications, such as for example packaging grass, maize, sugar beet pulp, malt, straw, household refuse, and the like.

For silage making, a baler is first used to press compact round or square bales which are subsequently wrapped tightly with a number of layers of net, twine or film in the baling chamber. Once the net, twine or film is lying around the bale, the formed bale is ejected from the baling chamber. The net, twine or film ensures that the product remains compressed and that the bale retains its shape. Subsequently, this bale is wrapped with an agricultural stretch wrap film by means of a bale wrapper. Before being wrapped around the bale, such an agricultural stretch wrap film is standard stretched by approximately 50 to 75% in the stretch unit of the bale wrapper. By wrapping the bale with a number of layers of agricultural stretch wrap film, an airtight and waterproof bale is obtained and a so-called oxygen-free environment is created inside the bale, which is necessary in order to ensure successful fermentation and storage. Obviously, the oxygen permeability, the number of layers around the bale and the adhesive power of the agricultural stretch wrap film are relevant in this context.

The film used for this purpose is usually a standard agricultural stretch wrap film having a thickness of 25 µm. These standard agricultural stretch wrap films for wrapping bales clearly differ from the industrial stretch wrap films, as the agricultural stretch wrap films have to be coloured and ultraviolet stabilized, but also have to have a different elasticity and a different and greater adhesive power.

U.S. Pat. No. 4,302,920 describes a process and apparatus for applying stretchable plastic film to loads for containment of the loads using two connected rollers driven by the film web so that the rollers are driven at different speeds to elongate the plastic film and wrapping the elongated film around a rotating load. This publication describes a stretch wrapper which stretches standard industrial stretch wrap films between 2 rollers and wraps them around a pallet.

However, it is also possible to use a prestretched stretch wrap film instead of a standard stretch wrap film. To this end, the film is stretched by the manufacturer in the machine direction (=longitudinal direction) in order, in this way, to produce a prestretched stretch wrap film.

US patent publication 2006/0243842 A1 describes a prestretched film for shrink-wrapping large items and a method for forming such a prestretched film. A prestretched film of a mono-orientated linear low density polyethylene (LLDPE) is prestretched from a raw film unstretched length to a desired length in two stretching stages. The prestretched film is wound into a roll with air spaces between the layers of the prestreched film, thereby creating a shock absorbing roll. A cast extrusion film is stretched in the longitudinal direction out of line with the extrusion installation and wound up with air between the layers. This prestretched film is used for wrapping pallet loads and has the aim of reducing the weight of the film, that it prevents and resists drop damage due to its shock absorbent characteristic and that it is easy to use and prevents injury by avoiding the effort required to hand-stretch film.

International patent application WO 99/67080 describes a method of forming plastics material fibres, filaments or film to improve their resistance to degradation by UV radiation and/or to increase their resistance to gas (oxygen) transmissivity, the method including stretching the material and allowing the film to at least partially relax.

The present prestretched agricultural stretch wrap films for baling applications have a thickness of less than 25 µm and have the following advantages compared to the standard agricultural stretch wrap films with a thickness of 25 µm:

- by prestretching, the oxygen permeability is maintained or an even lower oxygen permeability compared to the standard agricultural stretch wrap films is achieved;
- as the film is thinner, less film material has to be used for a bale;
- more (meters of) film can be fitted on a roll—at the same roll weight—so that more bales per roll can be wrapped and less time is therefore lost as a result of rolls being changed;
- fewer costs when discharging the film after use of the packaged product.

However, the currently known prestretched agricultural stretch wrap films also have a number of drawbacks. It is the case that a film—prior to being wrapped around the bale—is standard stretched by approximately 50 to 75% by means of a stretch unit provided on the bale wrapper. It has been found that the abovementioned prestretched agricultural stretch wrap films tear off more easily when stretched at this standard stretch percentage of approximately 50 to 75%, resulting in time loss for the user, badly wrapped bales and an increase in the use of film. One possible solution is to lower the stretch percentage on the bale wrapper, which has the drawback that the stretch unit on the bale wrapper has to be modified and also that the use of film increases. Furthermore, with the known prestretched agricultural stretch wrap films, the constriction (due to the stretching on the bale wrapper) is considerably smaller compared to the standard 25 µm agricultural stretch wrap films, as a result of which the overlap of the various layers around the bale is greater, resulting in an increased use of film. The term constriction (=neck-ing) is understood to mean the difference between the width of the film on the roll and the width of the film after stretching on the bale wrapper. In addition, the adhesive power of the currently known prestretched agricultural stretch wrap films is lower than with the standard 25 µm agricultural stretch wrap films, possibly resulting in the penetration of air and water between the layers and into the bale. The adhesive power of the agricultural stretch wrap film is very important in order to achieve good adhesion between the film layers around the bale and thus create an oxygen-free environment.

It is an object of the present invention to provide a prestretched agricultural stretch wrap film which can be used as an alternative to the standard agricultural stretch wrap films having a thickness of 25 µm, and which no longer have the abovementioned drawbacks of the known prestretched agricultural stretch wrap films.

The object of the present invention is achieved by providing a prestretched agricultural stretch wrap film suitable for baling applications and produced by prestretching a polyethylene-containing co-extruded blown film, which comprises at least two layers joined to one another, in the longitudinal direction up to at most 70%, so that it still has an elongation capability in the longitudinal direction of at least 310%.

Compared to the existing prestretched agricultural stretch wrap films, such a film has a higher elasticity in the longitudinal direction. This offers the advantage that when the film according to the invention is stretched on the bale wrapper at approximately 50 to 75%, there are no more processing (tearing) problems, thus eliminating the need for time-consuming modifications to the stretch unit of the bale wrapper. In addition, the film can be produced with a minimal thickness and this film has a constriction when stretched on the bale wrapper which is close to that of the standard agricultural stretch wrap films.

With a two-layer coextruded film according to the invention, the materials having large particle size, such as for example pigments, can be added (provided) in essentially one layer of the film, so that the surface roughness of the other layer is not affected, thus resulting in a significant improvement in respect of adhesive power with regard to mono-extruded films. With three or more layers of coextruded film according to the invention, the materials with large particle size are added (provided) mainly in the core layers of the film, so that the surface roughness of the two outer layers is not affected, resulting in an adhesive power which is equal to that of the standard agricultural stretch wrap films, so that a good adhesion between the layers of the bale is achieved and thus an oxygen-free environment is created.

The expression prestretched agricultural stretch wrap film is intended to mean an agricultural stretch wrap film which is stretched in the longitudinal direction (=machine direction) by means of an MDO unit (Machine Direction Orientation unit) in or out of line with the extrusion installation. Prestretching is applicable as well as to the tube (consisting of two films) as to the separate film. If desired, the agricultural stretch wrap film can then be relaxed in a relaxation unit and, in case of a tube, be split into two plain films and cut to the correct width(s) before being wound onto one or more rolls in a winder. Stretching in line with the extrusion installation is preferred, as the film then enters the MDO at a higher temperature, which gives a film with a lower oxygen permeability and a better homogeneity, and as this is moreover more economical than stretching out of line. Prestretching of the tube is preferred since one MDO unit stretches the two films at the same time.

The expression prestretch percentage is intended to mean the difference in speed between the stretching rollers in the MDO. The film according to the invention is prestretched by at most 70%, which means that the second stretching roller rotates at most 70% faster than the first stretching roller, so that the film is elongated at most 70% between the two stretching rollers. Stretching can also be carried out in two or more steps by using different stretching rollers. Prestretching the stretch wrap film can be carried out both under cold and hot conditions, but hot prestretching is very much preferred as this results in an agricultural stretch wrap film having a lower oxygen permeability and an improved homogeneity.

The term elongation capability in this patent application is understood to mean: the elongation percentage at break, measured in accordance with the ASTM D882 standard, in which a strip of film with a width of 15 mm is clamped between two clamps situated at a distance of 50 mm from each other. The film is subsequently stretched at a rate of 500 mm/min until the film breaks. At least five strips of the film must be tested. The mean value of the measurements indicates the elongation capability.

In a preferred embodiment of the prestretched agricultural stretch wrap film according to the invention, the abovementioned film has an elongation capability in the longitudinal direction of at least 330%. In particular, the film has an elongation capability in the longitudinal direction of at least 350%, more particularly of 370%, and most particularly of 390%.

In a more preferred embodiment of the prestretched agricultural stretch wrap film according to the present invention, said film has an elongation capability in the longitudinal direction of at least 410%. In particular, the film according to the invention has an elongation capability in the longitudinal direction of at least 430%, preferably of at least 450%, more particularly of at least 470%, and most particularly of at least 490%.

The object of the invention is also achieved by providing a prestretched agricultural stretch wrap film suitable for baling applications, the latter being produced by prestretching a polyethylene-containing co-extruded blown film which comprises at least two layers joined to one another, in the longitudinal direction up to a maximum of 70%, so that a force has to be exerted on said film of less than 6 N in order to stretch the film by 75% in the longitudinal direction. In particular, a force has to be exerted on said film of at most 5.5 N in order to stretch the film by 75% in the longitudinal direction. More particularly, a force of at most 5 N is to be exerted on said film in order to stretch the film by 75% in the longitudinal direction and most particularly a force of at most 4.5 N is to be exerted on said film in order to stretch the film by 75% in the longitudinal direction.

The force which is to be exerted in order to stretch the film by 75% in the longitudinal direction can be seen on the tensile strength graph at 75% elongation (=stretch). The tensile strength graph is obtained by measuring the elongation percentage at break in accordance with the ASTM D882 standard, in which a strip of film with a width of 15 mm is clamped between two clamps situated at a distance of 50 mm from each other. The film is subsequently stretched at a rate of 500 mm/min until the film breaks. At least five strips of the film must be tested. The mean value of the measurements indicates the force at 75%.

The prestretched agricultural stretch wrap film according to the invention is a blown extrusion film. In the blown extrusion process the tube of polyethylene is produced by a die with a circular gap. The tube is inflated by air to become a bubble of the required diameter before being hauled off by a pair of nip rollers which also retain the inflation air in the bubble. The amount of air present between the haul-off rollers and the die controls the bubble diameter and so the lay flat width. The bubble is cooled near the die to give a stable, symmetrical shape. After the haul-off rollers the tube is guided to the winder where the tube is split into two plain films. Because the diameter of the bubble is larger than the diameter of the die gap the blown film is not only oriented in the machine direction but also in the transverse direction (=bi-axial oriented), this results in a film with balanced properties. On the contrary a cast film is only oriented in the machine direction (=mono-oriented) because in the cast extrusion process the melt is forced through a long, thin rectangular gap to produce a sheet or plain film. Because of the blowing action in the blown extrusion process, a blown film has better balanced mechanical properties than a cast film, which makes blown extrusion film more suitable for wrapping round and square bales on a bale wrapper.

The prestretched agricultural stretch wrap film according to the invention contains polyethylene, such as LLDPE (linear low-density polyethylene) and/or mLLDPE (metallocene linear low-density polyethylene) and/or LDPE (low-density polyethylene) and/or EVA (Ethyl Vinyl Acetate) and/or EBA (Ethyl Butyl Acrylate) and/or EMA (Ethyl Methyl Acrylate) and/or plastomers.

According to a first preferred embodiment of the prestretched agricultural stretch wrap film according to the invention, said film is a two-layer co-extruded film which is essentially made from LLDPE and/or mLLDPE. Preferably said film said further comprises LDPE and/or EVA and/or EBA and/or EMA and/or plastomers. A two-layer co-extruded film has the advantage that the materials having a large particle size, such as pigments, can be added essentially in one layer of the film, so that the surface roughness of the other layer is not affected, which results in a significant improvement of the adhesive power with respect to mono-extruded films.

According to a second embodiment of the film according to the invention, said prestretched agricultural stretch wrap film is a co-extruded film which comprises at least three layers joined to one another, the first layer being essentially made of LDPE and/or LLDPE and/or mLLDPE, the core layer(s) being essentially made of LLDPE and/or mLLDPE, the third layer being essentially made of LLDPE and/or mLLDPE and/or EVA and/or EBA and/or EMA and/or plastomers and the core layer(s) being situated between the first and third layer. The first layer should be seen as the layer which is not adhesive or relatively less adhesive and which is situated on the inner side of the roll. The third layer should be seen as the adhesive layer which is situated on the outer side of the roll and is intended to be wrapped against a bale. A co-extruded film comprising at least three layers joined to one another has the advantage that materials having a large particle size, such as pigments, can be added essentially in the core layer(s), so that the surface roughness on both sides of the film is not increased and the adhesive power therefore remains unaffected.

According to a particular embodiment, said film contains an EVA and/or an EBA and/or an EMA having a co-polymer content of at least 9% by weight. Adding EVA and/or EMA and/or EBA results in a film with increased elastic properties.

According to a most preferred embodiment of the prestretched agricultural stretch wrap film according to the invention, said film is produced by prestretching a polyethylene-containing co-extruded blown film which comprises at least two layers joined to one another, in the longitudinal direction by at most 70%.

The prestretching percentage is intended to mean the difference in speed between the two stretching rollers in the MDO. Stretching can also be carried out in two or more steps by using different stretching rollers.

Prestretching the stretch wrap film can be carried out both under cold and hot conditions. Hot prestretching is very much preferred as this results in an agricultural stretch wrap film having a lower oxygen permeability and an improved homogeneity.

The film according to the present invention is produced by prestretching a film, in particular by at most 68%, preferably by at most 66%, more preferably by at most 64%, more particularly by at most 62%, most particularly by at most 60% and according to a particularly preferred embodiment the prestretched film is produced by stretching a film by at most 58%. According to an advantageous embodiment of the prestretched agricultural stretch wrap film according to the invention, the film is produced by stretching it by at most 30% and more particularly by at most 25%.

In a most preferred embodiment, the film according to the invention has a thickness of between 13 and 30 μm. In particular, the film has a thickness of between 14 and 25 μm, more particularly the film has a thickness of between 16 and 23 μm, and most particularly the film has a thickness of between 16 and 21 μm, and according to a particularly preferred embodiment the film has a thickness of between 16 and 18 μm.

With a film according to the invention having a thickness of less than 25 μm, the advantages of the current prestretched agricultural stretch wrap films are combined with easy processing without tearing at 50 to 75% stretch on the bale wrapper and with a constriction which comes close to that of the standard 25 μm agricultural stretch wrap films and with an adhesive power which is as great as that of the standard 25 μm agricultural stretch wrap films.

A film according to the invention with a thickness of 25 μm or more has the following advantages:
  easy processing at approximately 50 to 75% stretching on the bale wrapper;
  improved protection against oxygen penetration when wrapping the same number of layers of this film around the bale compared to the standard agricultural stretch wrap film;
  or fewer layers of film are required around the bale in order to achieve the same oxygen permeability as offered by standard agricultural stretch wrap film;
  providing fewer layers means that more bales can be wrapped with each roll and less time is therefore lost as a result of rolls being changed;
  providing fewer layers results in a time saving as less time is required to wrap a bale;
  providing fewer layers means fewer costs when discharging the film after use of the packaged product.

In a particularly advantageous embodiment of the film according to the invention, said film has an oxygen permeability of at most 10 000 $cc/m^2$.day.atm measured in accordance with ASTM D3985 standard (temperature: 23° C.; relative humidity: 75%).

The present invention will now be described in more detail by means of the following detailed description of some preferred embodiments of a prestretched agricultural stretch wrap film according to the present invention. The description is intended to give illustrative examples and to indicate further advantages and features of such films, and should therefore not be seen as in any way limiting the area of application of the invention or of the patent rights claimed in the claims.

In this detailed description, reference numerals are used to refer to the attached figures, in which:

FIG. 1 shows a diagrammatic representation of a number of prestretched agricultural stretch wrap films according to the invention, with FIG. 1a showing a two-layer co-extruded film, FIG. 1b a three-layer co-extruded film and FIG. 1c showing a five-layer co-extruded film;

FIG. 2 diagrammatically shows the constriction of the film according to the invention as a result of stretching on the bale wrapper;

Figure 3:
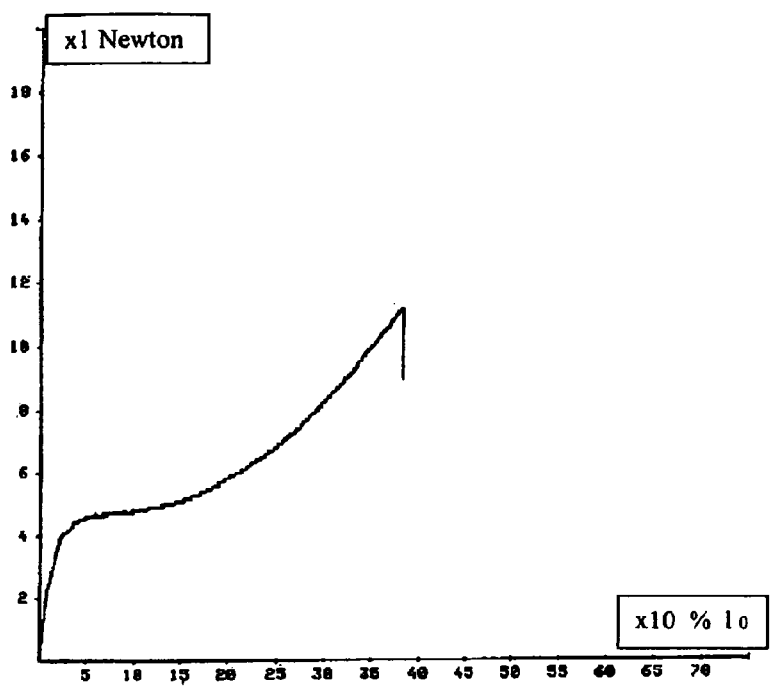
FIGS. 3 to 7 show a representation of the tensile strength graph of a film A, B, C, D and E according to the invention.
Figure 4:
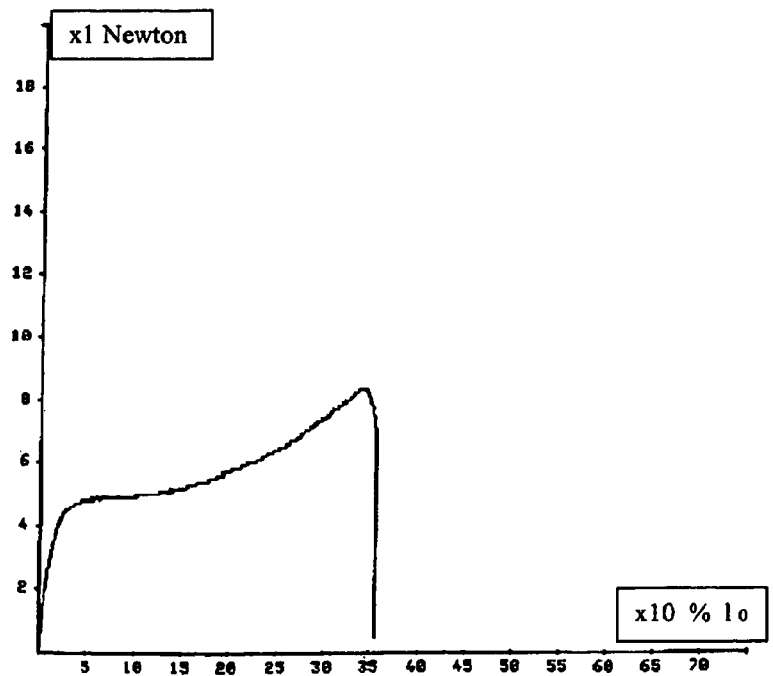
Figure 5:
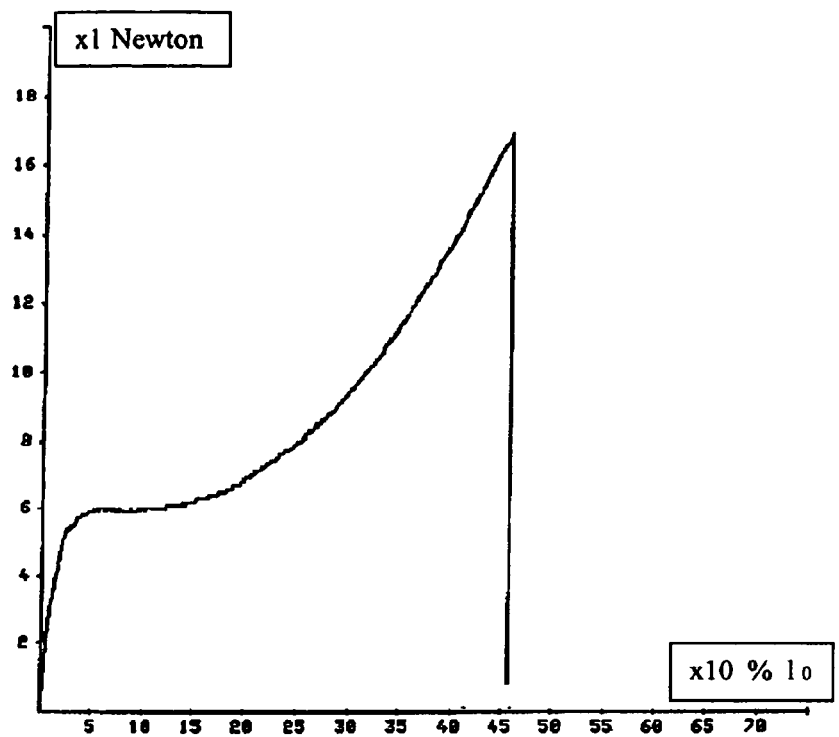
Figure 6:
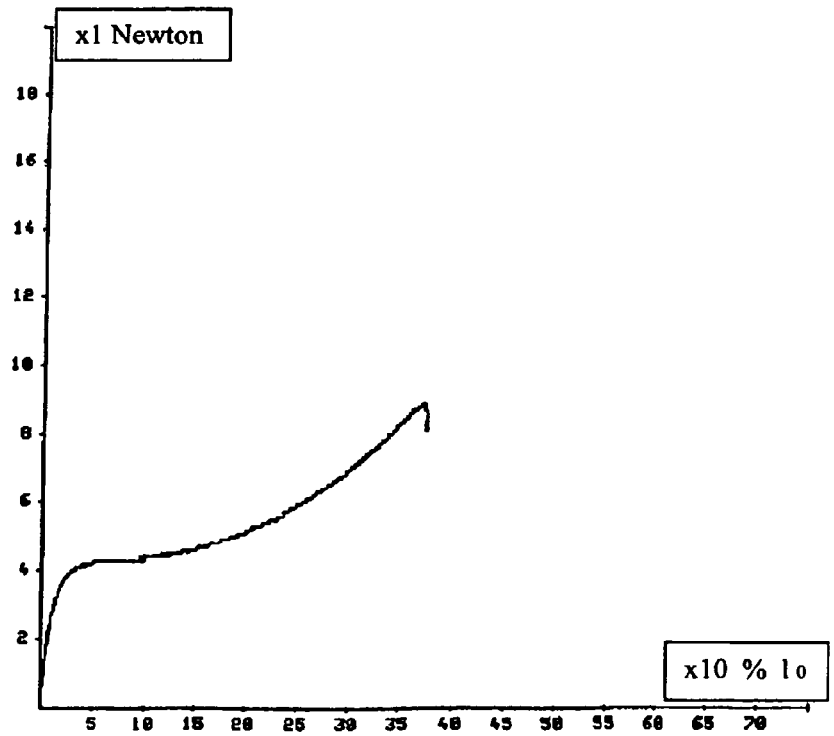
Figure 7:
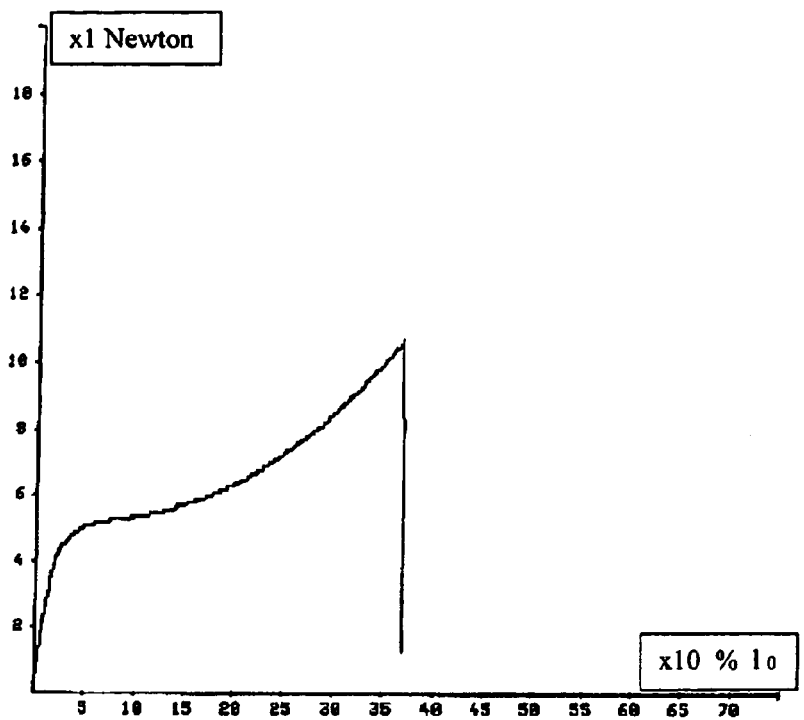
Figure 8:
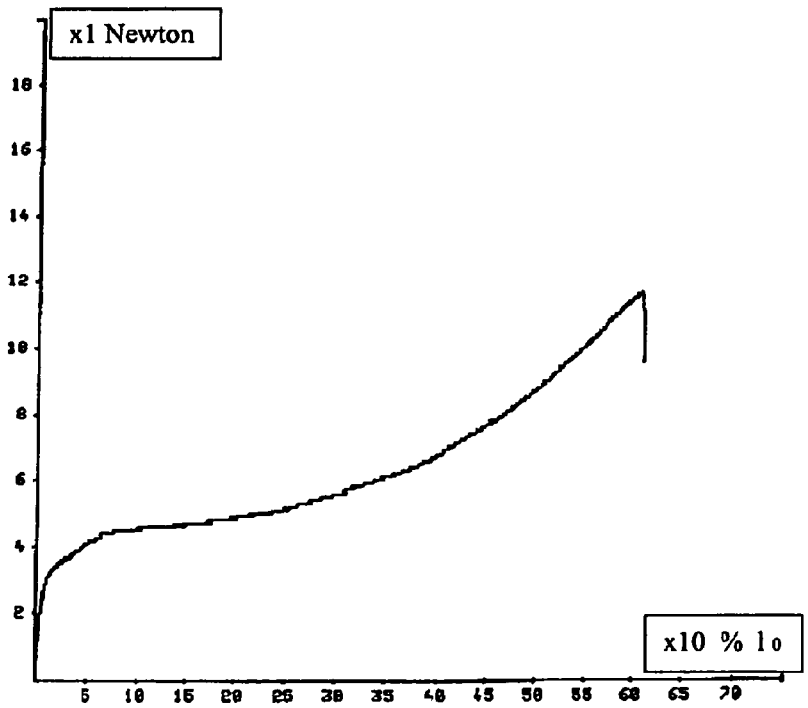
FIG. 8 shows a representation of a tensile strength graph of a standard agricultural stretch wrap film F.
Figure 9:
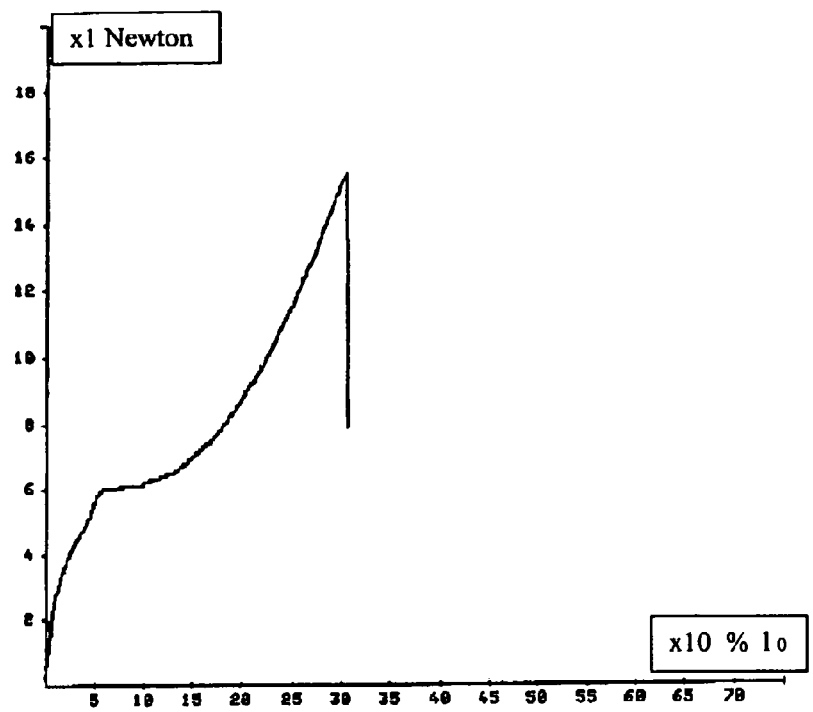
FIGS. 9 to 11 show a representation of a tensile strength graph of an existing prestretched agricultural stretch wrap film G, H and I.
Figure 10:
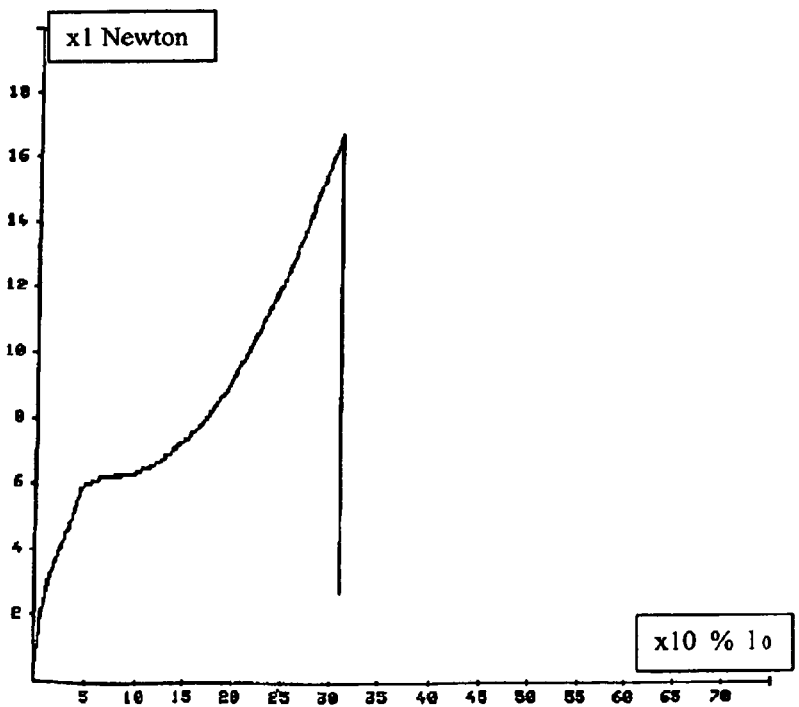
Figure 11:
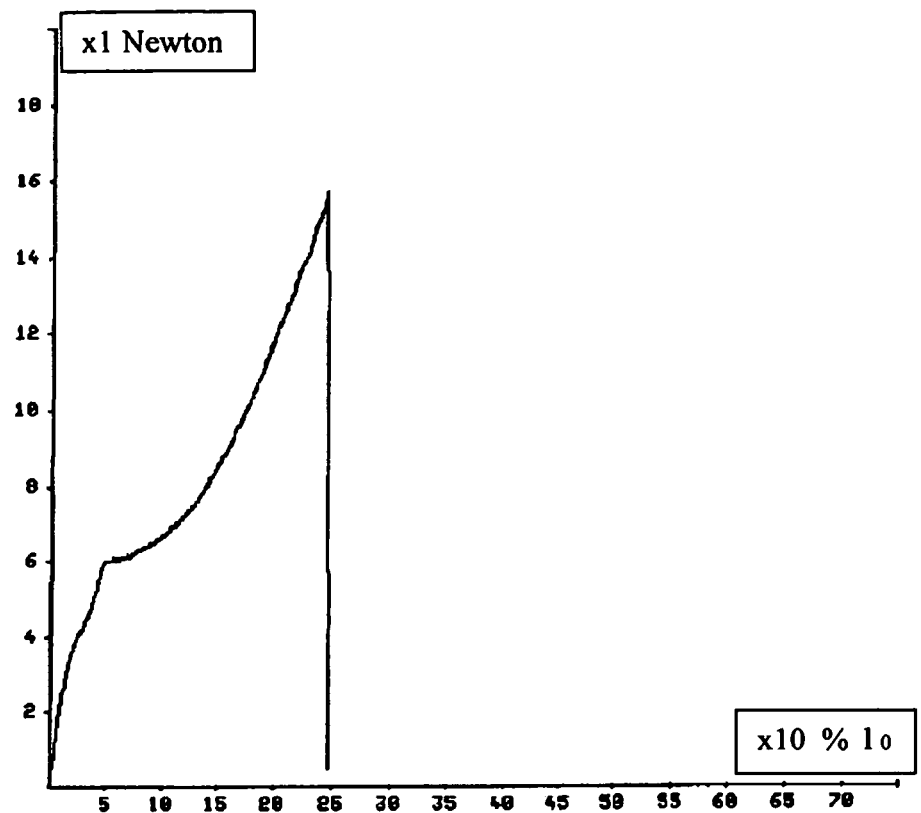

The prestretched agricultural stretch wrap film according to the invention has an elongation capability of at least 310% in the longitudinal direction and thus still has a relatively high elasticity in the longitudinal direction compared to the current prestretched agricultural stretch wrap films. This high elasticity is achieved by, on the one hand, making use of elastic raw materials based on polyethylene, such as for example LLDPE and/or mLLDPE and/or EVA and/or EBA and/or EMA and/or plastomers. On the other hand, it is important that the prestretched film is prestretched by only a small percentage, in particular smaller than or equal to 70%. The film does need to be prestretched to a sufficient degree in order to achieve the intended oxygen permeability. A standard agricultural stretch wrap film of 25 μm has an oxygen permeability of approximately 10 000 cc/m².day.atm, measured in accordance with the ASTM D3985 standard (temperature=23° C.; relative humidity=75%). Since a standard 25 μm agricultural stretch wrap film, which is wrapped around a bale in the correct manner, and with the correct number of layers, ensures that the bale is kept in good condition, it is thus important to ensure that the prestretched agricultural stretch wrap film has the same or even a lower oxygen permeability.

Due to its high elasticity in the longitudinal direction, the prestretched agricultural stretch wrap film according to the invention has various advantages:
- it can be stretched on the bale wrapper at approximately 50 to 75% without causing any problems regarding processing (tearing);
- it can be produced in a minimal thickness of, for example, 17 μm;
- it does not require any modifications to the stretch unit of the bale wrapper.

Furthermore, the prestretched agricultural stretch wrap film according to the invention has the advantage that when it is stretched on the stretch unit (3) of the bale wrapper, this film (1) has a constriction (I) which comes close to that of the standard agricultural films. This effect is diagrammatically illustrated in FIG. 2. In this case, the reference numerals refer to the following parts:

1a prestretched agricultural stretch wrap film according to the invention 1b prestretched agricultural stretch wrap film according to the invention after stretching on the stretch unit of the bale wrapper 2 film roll 3 stretch unit of the bale wrapper B1 Width of the film on the film roll B2 Width of the film after stretching on the stretch unit of the bale wrapper (the film has this width when it is wrapped around a bale)

I constriction

V1→V2 stretch percentage on the bale wrapper (=(V2−V1)*100/V1)

As illustrated in FIG. 1, the film according to the invention can have a number of embodiments. Thus, the film (1) can be a prestretched agricultural two-layer extruded stretch wrap film (FIG. 1a) which is essentially made from LLDPE and/or mLLDPE. The LLDPE and/or mLLDPE can, if desired, be mixed with LDPE and/or EVA and/or EBA and/or EMA and/or plastomers. Additives, such as UV stabilizer, pigments, PIB and the like, can be added to this mixture.

Preferably, the film (1) according to the invention is a prestretched agricultural co-extruded stretch wrap film which comprises three layers joined to one another (A1,A2,A3) (see FIG. 1b), the first layer (A1) being essentially made from LDPE and/or LLDPE and/or mLLDPE, the second layer (A2) being essentially made from LLDPE and/or mLLDPE, such as for example: Dowlex SL2103G, Elite 5400G, Polimeri FGH196, Exceed 1018CA, Dowlex 2045S and the like, the third layer (A3) being essentially made from LLDPE and/or mLLDPE and/or EVA and/or EBA and/or EMA and/or plastomers, and the second layer (A2) being situated between the first (A1) and third layer (A3). The first layer (A1) preferably makes up between 5 and 25% of the total thickness (D) of the film, the second layer (A2) between 50 and 90% of the total thickness (D) of the film and the third layer between 5 and 25% of the total thickness (D) of the film. The first layer (A1) is the layer which is not adhesive or relatively less adhesive and is situated on the inner side of the roll. The third layer (A3) is the adhesive layer which is situated on the outer side of the roll and which is wrapped against the bale. As illustrated in FIG. 1c, the film (1) according to the invention can comprise five layers joined to one another (A1,A2,A3,A4,A5) in order, in this way, to achieve an even higher degree of flexibility in the use of raw materials and an improved homogeneity.

Of course, further additives can be added to the film, such as for example:
UV stabilizer to achieve a specific UV stability of the film;
Pigments to produce a certain colouring;
PIB (polybutene) to achieve a certain adhesive power.

As LDPE does not have a high elasticity, the amount of LDPE should be kept limited by making the first layer small or by also using LLDPE and/or mLLDPE in the first layer.

The LLDPE or mLLDPE which is used for making the film has a density which is lower than or equal to 0.918 g/cm³. However, it is also possible to use LLDPE or mLLDPE having a density greater than 0.918 g/cm³, for example 0.920 g/cm³, but in that case:
the amount of LDPE in the film has to be reduced further and/or;
the amount of EVA and/or EBA and/or EMA has to be increased and/or;
a plastomer has to be added, such as for example Affinity EG8100G, Affinity VP8770G1, Exact 8201, . . . and/or;
the prestretching percentage in the MDO unit has to be lowered in order to increase the elasticity.

It should be noted that mono-extruded agricultural stretch wrap films have the drawback that the pigment is present on the two outer sides of the film. However, pigments (white, light green, dark green, . . . ) have a relatively great particle size, resulting in an increase in the surface roughness of the film. This has a negative effect on the adhesive power, as it will be reduced. In order to increase the adhesive power, more PIB can be added. However, PIB has the drawback that it causes a slip effect in the extrusion screw. More PIB therefore also means more slip in the extruder and more risk of creating gels in the film. This is the reason why the adhesive power of the currently known prestretched agricultural stretch wrap films, all of which are mono-extruded films, is lower than that of the standard agricultural stretch wrap films.

With two-layer extruded films, the pigment can be added on essentially one side of the film, which already results in a significant improvement with regard to adhesive power.

With a co-extruded film comprising at least three layers, the pigment can be added essentially in the core layer(s), which leaves the surface of the film unaffected. As a result thereof, the amount of PIB can be reduced while still producing an adhesive power which is as high as that of the standard 25 μm agricultural stretch wrap films.

The tube (consisting of two separate films) is produced with a well-defined thickness and width by means of the blown extrusion process. It is important that the extruded tube does not contain any impurities and has a narrow thickness variation. The tube produced is then stretched in the machine direction in an MDO unit (Machine Direction Orientation unit), relaxed in a relaxation unit and split into two plain films and cut to the correct widths before being wound onto rolls in a winder.

The prestretched agricultural stretch wrap film according to the invention is only prestretched to a slight degree, resulting in a prestretched agricultural stretch wrap film having a high elasticity. The prestretching of the stretch wrap film can be carried out under cold or hot conditions. However, when prestretching under hot conditions, an agricultural stretch wrap film having a lower oxygen permeability and an improved homogeneity is obtained. The percentage (%) by which the extruded film is stretched in the MDO unit is determined by the adjustment of the stretching rollers in the MDO unit. The film according to the invention is prestretched by at most 70% between the stretching rollers in the MDO unit.

Below, the invention is illustrated by means of a comparison between five prestretched agricultural stretch wrap films according to the invention (A, B, C, D and E), a standard agricultural stretch wrap film (F) and three existing prestretched agricultural stretch wrap films (G, H and I).

The different films (A, B, C, D, E, F, G, H and I) are subjected to a tensile test in the longitudinal direction on a laboratory tensile tester in accordance with the ASTM D882 standard. To this end, a strip of film having a width of 15 mm is clamped between two clamps which are situated at a distance of 50 mm from each other. Subsequently, the film is stretched at a rate of 500 mm/min until the film breaks. In each case five strips of the film are tested. The average value of the five measurements indicates the elongation capability. For each film, the tensile strength graph which comes closest to the average value is shown in FIGS. 3 to 11, the stretch percentage being plotted on the X axis and the force exerted (Newton) on the film being plotted on the Y axis. For each film, the thickness and the oxygen permeability were measured as well, the former in accordance with ISO 4593 standard and the latter in accordance with ASTM D3985 standard (temperature: 23° C.; relative humidity: 75%).

The following films were analyzed:

Film A

Prestretched agricultural stretch wrap film (three-layer co-extruded blown film) from the patent proprietor according to the invention having the following composition:
first layer: LDPE; second layer: LLDPE (Dowlex SL2103G: density=0.917 g/cm$^3$) and a small amount of EVA (Exxon FL00119); third layer: EVA (Exxon FL00119)/LLDPE (Dowlex 2045S) mixture;
light-green pigment was added to the second layer;
in addition, PIB and UV stabilizer were added to the various layers.

The prestretching percentage between the stretching rollers in the MDO unit was 60%, the extrusion thickness=27 μm and the thickness of the film on the roll in the winder=±17 μm.

Film B

Prestretched agricultural stretch wrap film (three-layer co-extruded blown film) from the patent proprietor according to the invention having the following composition:
first layer: LDPE; second layer: LLDPE (Polimeri FGH196: density=0.916 g/cm$^3$)+a small amount of EVA (Exxon FL00119); third layer: EVA (Exxon FL00119)/LLDPE (Dowlex 2045S) mixture;
white pigment was added to the second layer;
in addition, PIB and UV stabilizer were added to the various layers.

The prestretching percentage between the stretching rollers in the MDO unit was 55%, the extrusion thickness=26 μm and the thickness of the film on the roll in the winder=±17 μm.

Film C

Prestretched agricultural stretch wrap film (three-layer co-extruded blown film) from the patent proprietor according to the invention having the following composition:
first layer: LDPE; second layer: LLDPE (Dowlex SL2103G: density=0.917 g/cm$^3$)+a small amount of EVA (Exxon FL00119); third layer: EVA (Exxon FL00119)/LLDPE (Dowlex 2045S) mixture;
light-green pigment was added to the second layer;
in addition, PIB and UV stabilizer were added to the various layers.

The prestretching percentage between the stretching rollers in the MDO unit was 65%, the extrusion thickness=37 μm and the thickness of the film on the roll in the winder=±25 μm.

Film D

Prestretched agricultural stretch wrap film (three-layer co-extruded blown film) from the patent proprietor according to the invention having the following composition:
first layer: LDPE; second layer: LLDPE (Polimeri FGH196: density=0.916 g/cm$^3$)+a small amount of EVA (Exxon FL00119); third layer: EVA (Exxon FL00119)/LLDPE (Dowlex 2045S) mixture;
light-green pigment was added to the second layer;
in addition, PIB and UV stabilizer were added to the various layers.

The prestretching percentage between the stretching rollers in the MDO unit was 55%, the extrusion thickness=26 μm and the thickness of the film on the roll in the winder=±17 μm.

Film E

Prestretched agricultural stretch wrap film (three-layer co-extruded blown film) from the patent proprietor according to the invention having the following composition:
first layer: LDPE; second layer: mLLDPE (Elite 5400G: density=0.916 g/cm$^3$)+a small amount of EVA (Exxon FL00119); third layer: EVA (Exxon FL00119)/LLDPE (Dowlex 2045S) mixture;
white pigment was added to the second layer;
in addition, PIB and UV stabilizer were added to the various layers.

The prestretching percentage between the stretching rollers in the MDO unit was 55%, the extrusion thickness=26.5 μm and the thickness of the film on the roll in the winder=±17 μm.

Film F

Standard agricultural stretch wrap film having a thickness of ±25 μm.

Film G

Prior-art black mono-extruded prestretched agricultural stretch wrap film from manufacturer A having a thickness of ±17 μm.

Film H

Prior-art light-green mono-extruded prestretched agricultural stretch wrap film from manufacturer A having a thickness of ±17 μm.

Film I

Prior-art white mono-extruded prestretched agricultural stretch wrap film from manufacturer B having a thickness of ±13 μm.

The following table shows the results measured for the various films (A-I). Each film was in each case subjected five times to a tensile test in the longitudinal direction of the film in accordance with the ASTM D882 standard. The average value of the five measurements indicates the elongation capability.

TABLE 1.1 measured thickness, elongation at break and oxygen permeability

|   | Measured thickness (μm) | Min. elongation % at break (%) | Max. elongation % at break (%) | Average elongation % at break (%) | Oxygen permeability cc/(m² · day · atm) |
|---|---|---|---|---|---|
| A | 16.5 | 363.8 | 414.6 | 379.5 | 9394 |
| B | 16.6 | 331.4 | 383.8 | 350.9 | 8929 |
| C | 23.7 | 408.2 | 468.8 | 445.6 | 6375 |
| D | 16.3 | 337.2 | 389.8 | 369.8 | 8246 |
| E | 17.0 | 349 | 392.4 | 369.5 | 8423 |
| F | 24.8 | 555.2 | 627.6 | 597.9 | 9955 |
| G | 16.4 | 234 | 338.8 | 306.2 | 8445 |
| H | 16.1 | 274.8 | 315.6 | 304.3 | 10055 |
| I | 12.0 | 223.2 | 262.4 | 246.4 | 9618 |

As the above table 1.1 shows, currently known prestretched agricultural stretch wrap films G, H and I have an elongation capability of 306%, 304% and 246%, respectively, and are therefore less elastic compared to the films according to the invention, see for example film D which has an elongation capability of 370%. As a result thereof, there are no more processing problems during wrapping on the bale wrapper at approximately 50 to 75% stretch and the constriction of the film will come close to that of the standard 25 μm agricultural stretch wrap film.

Although films A, B, D, E only have a thickness of ±17 μm, the oxygen permeability is as low as that of a standard 25 μm agricultural stretch wrap film (film F) or even lower. When wrapping the same number of layers of film around the bale, the 17 μm prestretched agricultural stretch wrap films according to the invention, therefore results in the same oxygen permeability as a standard 25 μm agricultural stretch wrap film.

Film C is of approximately the same thickness as standard agricultural stretch wrap film F, but has an oxygen permeability which is approximately one third lower, which means that, for example, instead of 6 layers of standard 25 μm agricultural stretch wrap film, only 4 layers of prestretched 25 μm agricultural stretch wrap film according to the invention can be wrapped around the bale in order to achieve the same oxygen permeability.

The object of the invention is also achieved by a prestretched agricultural stretch wrap film in which a force is to be exerted on said film of less than 6 N in order to stretch the film by 75% in the longitudinal direction.

In the following Table 1.2, the measured forces (expressed in Newton) which are required to stretch the films by 50, 75 and 100%, respectively, in the longitudinal direction are given. These forces have been determined from the tensile strength graphs 3 to 11 of the tensile tests which have been carried out five times on each film in accordance with ASTM D882 standard. The average value of the five measurements indicates the force at 50%, 75% and 100%.

TABLE 1.2 measured forces at 50, 75 and 100% elongation

|   | Force at 50% elongation (N) | Force at 75% elongation (N) | Force at 100% elongation (N) |
|---|---|---|---|
| A | 4.6 | 4.7 | 4.8 |
| B | 4.8 | 4.9 | 4.9 |
| C | 5.9 | 5.9 | 5.9 |
| D | 4.3 | 4.3 | 4.4 |
| E | 5.1 | 5.3 | 5.4 |
| F | 4.1 | 4.4 | 4.5 |
| G | 5.6 | 6 | 6.2 |
| H | 6 | 6.2 | 6.4 |
| I | 6 | 6.2 | 6.7 |

The force (N) which is required to stretch a standard 25 μm agricultural stretch wrap film (F) by 75%, which is approximately the stretch percentage which is used on a bale wrapper, is approximately 4.4 N. The prestretched agricultural stretch wrap films (A, B, D, E) with a thickness of approximately 17 μm according to the invention require forces of 4.3 to 5.3 N to achieve the same stretch percentage and can thus be stretched almost as easily, as a result of which there are no processing problems on the bale wrapper and the constriction comes close to that of the standard agricultural stretch wrap films. Film D even requires a slightly lower force (namely 4.3 N) compared to the standard 25 μm agricultural stretch wrap film.

Conversely, the currently known prestretched agricultural stretch wrap films (G, H and I) require significantly greater forces at the same stretch percentage (namely of between 6 and 6.2 N), as a result of which these films are not easily stretched, processing (tearing) problems may occur on the bale wrapper, the constriction is less and there is a higher consumption of film.

For 75% stretch, the prestretched agricultural stretch wrap film C according to the invention requires a force of 5.9 N, which is even lower than the currently known prestretched agricultural stretch wrap films of ±17 μm and ±13 μm (G, H and I), although this prestretched agricultural stretch wrap film C is much thicker (±25 μm).

The same conclusions can be drawn when comparing the forces at 50 and 100% elongation.

Figure 12:
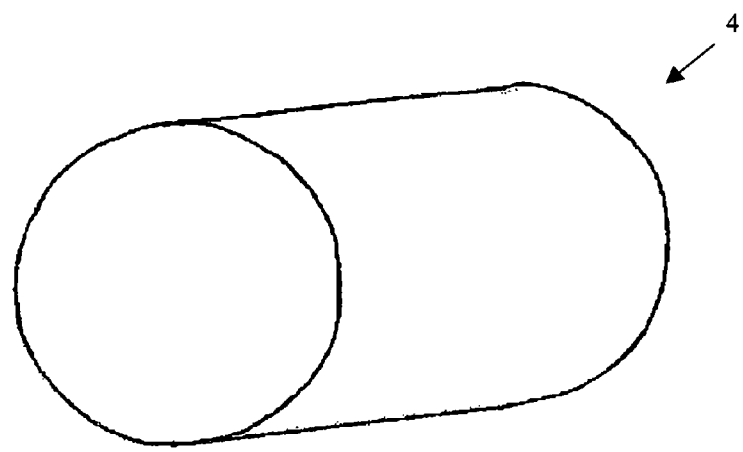
FIG. 12 shows a perspective view of a round bale.
Figure 13:
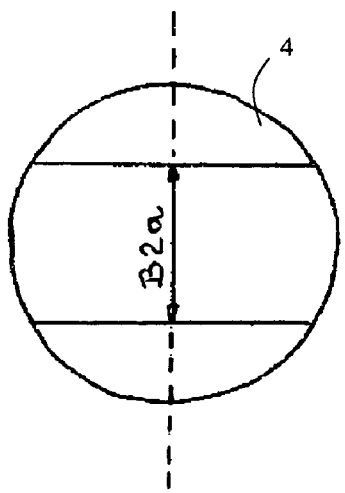
FIG. 13 shows a side view of the bale represented in FIG. 12.
Figure 14:
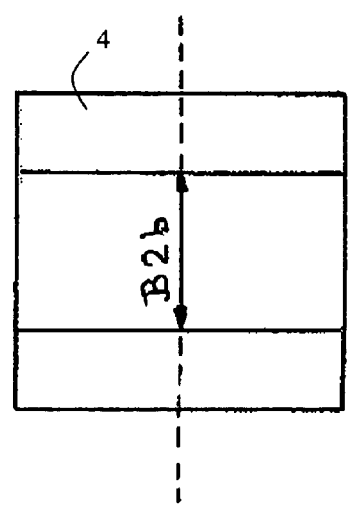
FIG. 14 shows a front view of the bale represented in FIG. 13.

Furthermore, the constriction of the various films (A-I) has also been measured after they were wrapped onto a round bale (4) (see FIG. 12) by means of a bale wrapper with a stretching system of ±70%. The following parameters are listed in Table 1.3 below:

width B1: width of the film on the roll;
width B2a: width of the film, measured on both sides, in the centre of the bale (see FIG. 14);
width B2b: width of the film, measured on both round sides, in the centre of the bale (see FIG. 15);
width B2: average width of B2a and B2b;
constriction I: width B2 minus width B1;

TABLE 1.3 measured widths and constriction

|   | Width B1 mm | Width B2a mm | Width B2b mm | Width B2 mm | Constriction I mm |
|---|---|---|---|---|---|
| A | 750 | 595 | 620 | 607.5 | 142.5 |
| B | 750 | 600 | 625 | 612.5 | 137.5 |
| C | 750 | 600 | 625 | 612.5 | 137.5 |
| D | 750 | 600 | 620 | 610 | 140 |
| E | 750 | 600 | 625 | 612.5 | 137.5 |
| F | 750 | 585 | 605 | 595 | 155 |
| G | 750 | 620 | 640 | 630 | 120 |
| H | 750 | 630 | 640 | 635 | 115 |
| I | 730 | x | x | x | x |

With a standard agricultural stretch wrap film having a roll width of 750 mm, the width around the bale has to be between 580 and 620 mm. This is also evident from the average width which is measured on the standard agricultural stretch wrap film (F), namely 595 mm, thus resulting in a constriction (=neck-ing) of 155 mm. With the prestretched agricultural stretch wrap films according to the invention, the average width is between 607.5 and 612.5 mm and thus close to the constriction of a standard agricultural stretch wrap film, certainly with samples A and D, where the constriction is 140 and 142.5 mm. By contrast, the currently known prestretched agricultural stretch wrap films G and H still have an average width of 630 and 635 mm and thus a constriction of only 115 and 120 mm, which is significantly less than with the standard agricultural stretch wrap film. For sample I, it was impossible to measure the width around the bale since the film always tore when it was stretched on the bale wrapper.

Furthermore, the adhesive power of all films was checked. To this end, the rolls were first acclimatized in a room (conditioned lab) at a temperature of 23° C. for 48 hours. Thereafter, half a meter of film was manually unwound from the roll and stretched by hand in order thus to simulate stretching on the bale wrapper. Subsequently, the half a meter of film was wound back onto the roll. After 5 seconds, the film was pulled back off the roll and the adhesion of the film (and thus the adhesive power) between the adhesive layer and the non-adhesive or less adhesive layer was assessed. The adhesive layer is the outer layer of the roll, the non-adhesive or less adhesive layer is the inner layer of the roll. The harder (easier) it is to pull the film off the roll, the higher (lower) the adhesive power. This test was carried out three times by a test panel consisting of 3 people, with each of the participants giving an assessment. In the table, the average result is given in each case. The assessment of the adhesive power is expressed as a mark between 0 and 10, the marks indicating:

| | |
|---|---|
| 0 | no adhesive power |
| 1 | very low adhesive power |
| 2 and 3 | insufficient adhesive power |
| 4 | lower threshold adhesive power |
| 5 | normal adhesive power for agricultural stretch wrap film for baling applications |
| 6 | upper threshold adhesive power |
| 7 and 8 | too high adhesive power |
| 9 | very high adhesive power |
| 10 | abnormally high adhesive power |

Thus, the higher the adhesive power, the higher the mark will be. The standard 25 µm agricultural stretch wrap films for baling applications have a value for adhesive power of between 4 and 6. This is necessary as the bales are stored outside and have to be able to withstand 1 year of rain and wind. At a lower value for adhesive power, there is a risk of penetration of air and water between the layers and inside the bale, for example resulting in the formation of mould in silage bales. At a relatively high value, there is a risk of the film tearing during wrapping on the balewrapper and during manipulation and stacking of the bale in warm weather.

The following Table 1.4 gives the marks for the various films (A-I):

TABLE 1.4 assessment of adhesive power

| | Assessment of adhesive power (value between 0 and 10) |
|---|---|
| A | 6 |
| B | 5 |
| C | 5 |
| D | 5 |
| E | 6 |
| F | 5 |
| G | 5 |
| H | 3 |
| I | 3 |

From the above results, it is clear that the prestretched agricultural stretch wrap films according to the invention have an adhesive power which is equal to that of the standard 25 µm agricultural stretch wrap films and thus satisfy the requirements for baling applications. By contrast, the adhesive power of the currently known white and light-green prestretched agricultural stretch wrap films (H and I) is not sufficient (value equal to 3), resulting in possible penetration of air and water. This is due to the fact that the currently known prestretched agricultural stretch wrap films are mono-extruded films, as a result of which the white and light-green pigments are present on the outer surface. This increases the surface roughness and reduces the adhesion and thus the adhesive power. Only the known black prestretched agricultural stretch wrap film G has a good adhesive power as this is a black-coloured film. This is due to the fact that the particle size of black pigment is much smaller than that of, for example, the white and light-green pigment, and therefore this black pigment has less effect on the adhesive power. As the currently known coloured prestretched agricultural stretch wrap films (with the exception of black agricultural stretch wrap films) have a weak adhesive power, these films are not suitable to be used when bales are stored outside. The co-extruded prestretched agricultural stretch wrap films according to the invention, however, can be produced in any desired colour and still provide the required adhesive power for baling applications.

What is claimed is:

1. A method for wrapping a bale with a prestretched agricultural stretch wrap film suitable for baling applications comprising, providing the prestretched agricultural stretch wrap film wound onto a roll; wrapping the bale with the prestretched agricultural stretch wrap film, characterized in that providing the prestretched agricultural stretch wrap film film is produced by prestretching a polyethylene-containing co-extruded blown film, which comprises at least two layers joined to one another, in the longitudinal direction up to at most 70%, by a Machine Direction Orientation (MDO) unit in or out of line with the extrusion installation, so that it still has an elongation capability in the longitudinal direction of at least 310% as measured according to ASTM D882, and wherein said film has a thickness of between 13 and 30 gm.

2. The method according to claim 1, characterized in that said film has an elongation capability in the longitudinal direction of at least 330%.

3. The method according to claim 1, characterized in that said film has an elongation capability in the longitudinal direction of at least 350%.

4. The method according to claim 1, characterized in that said film has an elongation capability in the longitudinal direction of at least 370%.

5. The method according to claim 1, wherein a force has to be exerted on said film (1) of less than 6 N in order to stretch the film (1) by 75% in the longitudinal direction.

6. The method according to claim 5, characterized in that a force has to be exerted on said film of at most 5.5 N in order to stretch the film by 75% in the longitudinal direction.

7. The method according to claim 1, characterized in that said film is a two-layer co-extruded blown film which is essentially made from LLDPE and/or mLLDPE.

8. The method according to claim 7, characterized in that said film further comprises LDPE and/or EVA and/or EBA and/or EMA and/or plastomers.

9. The method according to claim 1, characterized in that said film is a co-extruded blown film which comprises at least three layers joined to one another, the first layer being essentially made of LDPE and/or LLDPE and/or mLLDPE, the core layer(s) being essentially made of LLDPE and/or mLLDPE, the third layer being essentially made of LLDPE and/or mLLDPE and/or EVA and/or EBA and/or EMA and/or plastomers, the core layer(s) being situated between the first and third layer.

10. The method according to one of claim 8 or 9, characterized in that said film contains an EVA and/or EBA and/or EMA having a co-polymer content of at least 9% by weight.

11. The method according to claim 1, characterized in that said film is produced by prestretching a film in the longitudinal direction by at most 66%.

12. The method according to claim 1, characterized in that said film is produced by prestretching a film in the longitudinal direction by at most 62%.

13. The method according to claim 1, characterized in that said film is produced by prestretching a film in the longitudinal direction by at most 58%.

14. The method according to claim 1, characterized in that the film has a thickness (D) of between 16 and 23 µm.

15. The method according to claim 1 wherein said film has an oxygen permeability of at most 10.000 cc/m$^2$.day.atm.

16. The method according to claim 1, whereby grass, maize, sugar beet pulp, malt, straw or household refuse is packaged.

* * * * *